Figure 1:
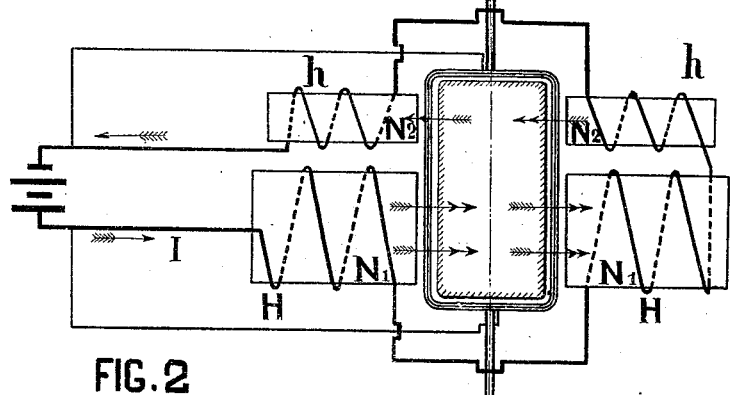

(No Model.)

B. ABDANK-ABAKANOWICZ.
HYSTERESIS COMPENSATOR.

No. 545,042. Patented Aug. 27, 1895.

Witnesses

Inventor
Bruno Abdank-Abakanowicz
by Bentley & Blodgett
Attys.

United States Patent Office.

BRUNO ABDANK-ABAKANOWICZ, OF ST. MAUR, FRANCE.

HYSTERESIS-COMPENSATOR.

SPECIFICATION forming part of Letters Patent No. 545,042, dated August 27, 1895.

Application filed March 17, 1893. Serial No. 466,407. (No model.) Patented in France March 6, 1893, No. 228,400, and in Germany March 22, 1893, No. 78,937.

*To all whom it may concern:*

Be it known that I, BRUNO ABDANK-ABAKANOWICZ, electrical engineer, of Parc St. Maur, near Paris, France, have invented certain new and useful Improvements in Methods of Compensating for Hysteresis, (for which I have obtained Letters Patent of the Republic of France, No. 228,400, dated March 6, 1893, and of the Empire of Germany, No. 78,937, dated March 22, 1893,) of which the following is a specifiation.

It is well known that in all electromagnetic apparatus in which iron is used as an electromagnet or solenoid acting on a core, plate, or armature of iron, or even upon a coil or another electromagnet, it is impossible to realize or obtain effects that are proportional to the current or to any exact function of the current; or the above may be stated thus: first, the error of magnetization of iron is not a straight line, because the magnetization produced is never proportional to the current producing it; second, the function of magnetization is double—that is to say, the quantity of magnetism actually produced does not depend exactly on the quantity of current producing it, but also on the value of the current by which the magnetic system had been previously energized. This difficulty presents itself especially in that class of apparatus which depends upon certain fluxes of magnetism, as in electrical-measuring apparatus, and in indicating apparatus or that class of apparatus in which a mechanical action is brought into play, due to an electric current having attained a certain predetermined value. It is a well-known fact that when, in the last-mentioned class of apparatus we employ masses of iron or electromagnets, it is impossible to make them work in a predetermined and satisfactory manner, and that the cause is due to residual magnetism, which is but a particular case of the general effect known as "magnetic hysteresis."

My invention consists, therefore, in the combination with a magnetic circuit of one or more masses of iron, steel, or other magnetic matter, constituting what I call a "secondary differential magnetic circuit or circuits." This secondary circuit may be magnetized by the same current as that employed for the principal magnetic circuit, or it may be magnetized by a certain fraction of this current; but the actions of the lines of force of the secondary circuit are in an opposite sense to those of the principal circuit. By choosing suitably the dimensions of the secondary magnetic circuit with reference to its own physical properties, those of the principal circuit, the ratio of the air space to the rest of the circuit, and the magnetizing force employed, a differential value of the magnetic flux or differential value of the mechanical effects produced by the system on a core, coil, or armature, may be obtained for all currents within the working range of the apparatus, which shall be proportional to those currents. This may be briefly stated thus: The effect of the residual magnetism of the first circuit is neutralized by the residual magnetism of the second.

It is to be understood that the two magnetic circuits are not necessarily independent of each other, and that the conductor turns of one may be employed to energize the other. The practical realization of this combination does not present any difficulty from the fact that the magnetization curves of iron, steel, &c., are very similar in form, and that by a judicious choice of material, such as wrought or cast iron, steel, or other magnetic matter, combined with an air-space of suitable dimensions, it is always possible to obtain curves of the same form in such a way that the difference is represented very nearly by a straight line, which is a function of the ampère-turns. It is also possible, as is required in some particular cases, to have a curve of other shape than a straight line.

For the sake of greater clearness I will illustrate the application of my invention to several simple cases, it being, however, clearly understood that I do not limit myself to the particular cases cited, but aim to embrace the use of a differential magnetic system of the type described for the compensation of hysteresis.

Figure 2:
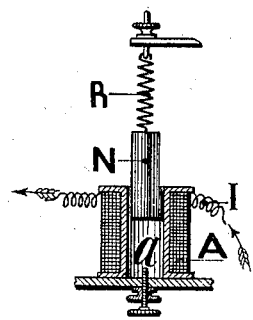
Figure 4:
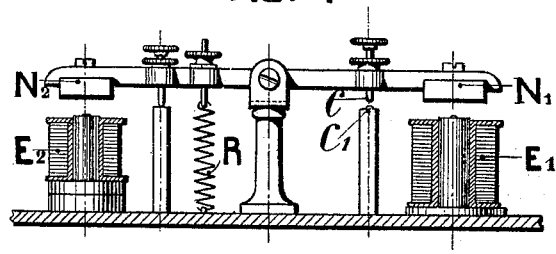
Figure 3:
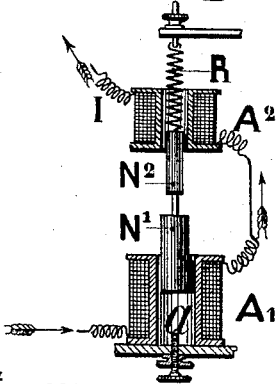
Figure 5:
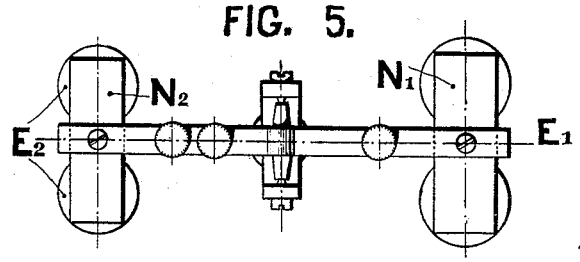

In the accompanying drawings, which show mechanism embodying my invention, Figure 1 is a sectional diagram of a wattmeter, showing its principles. Fig. 2 is a section of an ordinary solenoid or electromagnet. Fig. 3 is a section of a differential solenoid embracing my invention. Fig. 4 is a sectional side elevation of a similar arrangement in a different form, and Fig. 5 is a plan of the parts shown in Fig. 4.

Suppose, for example, that it is required to construct a wattmeter for the measurement of continuous currents of the type represented by the diagram, Fig. 1. The potential is measured by the movable coil and the current is made to traverse the coils H of the principal electromagnet and the coils $h$ of the secondary or compensating electromagnet. The core $N'$, which produces the principal flux, should be made of metal having the smallest amount of hysteresis possible, of soft iron, for instance, while $N^2$, which produces the flux for compensation, should be made of cast iron or steel, or some metal having a high coefficient of hysteresis.

The double arrows in the diagram represent the directions of the magnetic fluxes and the single arrows of those of the current. By varying the sections of the two cores $N'$ $N^2$ the ampère-turns applied to these core and the air-spaces of the magnetic circuits, it is possible to make a combination such that the residual magnetism is either entirely or only in part compensated, and that the resultant magnetic flux will be always proportional to the current, in which case the resultant torque of the armature will be proportional to the watts. I may apply practically the same method to the case of a solenoid acting on a core of soft iron, which core it is desired shall be drawn in by the action of the solenoid to a certain predetermined point when the current shall have attained a certain predetermined value.

In many forms of apparatus a solenoid A, Fig. 2, through the coils of which passes a current, acts on an iron core N, suspended by a spring R or held in equilibrium by a counterpoise. For a certain value of current the core should arrive at a certain position—for instance, to just touch the stop $a$. This condition can never be quite realized by the employment of a form of apparatus similar to that shown in Fig. 2, for the reasons previously mentioned, due to hysteresis, and to avoid this difficulty, which prevents the construction of apparatus of great precision, I may employ my method as follows: I employ two cores $N'$ $N^2$, Fig. 3, connected together mechanically. $N'$ is the principal core, and is composed of material possessing small hysteresis. $N^2$ is of smaller section than $N'$, but is made of a material having a high coefficient of hysteresis. To the first core I apply what I call the "principal solenoid" $A'$, which tends to attract the core in a certain sense, and to the second core I apply a solenoid $A^2$, called the "compensating solenoid," which attracts its core in an opposite sense. The resultant attraction on the two cores will therefore be the difference of the two attractions, and from what has been said above it is easy to understand that the effects of hysteresis can be compensated for, especially with regard to the position of contact of the core with the stop when the two solenoids are traversed by the same current or by currents which bear always a certain proportion to each other.

The above-described combination, of which the mechanical disposition may be varied in an almost infinite number of ways, has for its object to render the resultant attraction independent of the effects of hysteresis in the core. The result aimed at is obtained by a suitable choice of the nature of the cores $N'$ $N^2$, of the ratio of the turns on the solenoid $A'$ $A^2$, (or of the ratio of the ampère turns if the two solenoids be in multiple,) and of the relative position of the solenoids with respect to the cores.

To demonstrate further the generality of the application of my method of compensation I may give one more example. In a great many forms of apparatus there is an electromagnet which acts on a plate of soft iron, forming an armature, by the mechanical movement of which certain desired results are to be achieved—for instance, to establish an electric contact when the armature is attracted by the electromagnet. In this form of apparatus again precision is effected by eliminating hysteresis. The position of the armature or plate for a certain current is not always the same if the current has once surpassed a certain limiting value. The deviation is still greater if the apparatus be employed with alternating currents.

My method of compensation is particularly applicable to the case just mentioned, and constitutes an important improvement when applied to this class of apparatus. Fig. 4 represents the application to a particular case of this nature. The principal electromagnet $E'$ acts on the soft iron armature $N'$ in opposition to the spring R and against the action of the differential electromagnet $E^2$ and the armature $N^2$, which have a high coefficient of hysteresis. The two electromagnets are supposed to be excited by the same current, which presents the simplest case. By choosing suitably the elements of the magnetic circuits of the two electromagnets it is easy to arrive at such a combination as will insure that the contact between $c$ $c'$ will always just take place when the current has attained a certain predetermined value, whatever may have been the previous values of the current. The practical rule to follow in this case is as follows: The attraction due to the residual magnetism of the electromagnet $E^2$ and of the armature $N^2$ ought to be equal to the attraction produced by the residual magnetism of the electromagnet $E'$ and of the armature $N'$ for the position of contact.

It is possible to show an almost infinite number of examples of the application of my method, but I consider that those already cited are sufficient to illustrate its operation,

Having thus described my invention, what I claim as new, and desire to secure by Letters Patent, is—

1. The method of correcting or neutralizing the effect of hysteresis in electro-magnetic apparatus, which consists in employing in such apparatus a main and an auxiliary magnetic circuit and neutralizing the effect of the residual magnetism of the first circuit by that of the second.

2. In combination, an electric circuit, and an electro-magnetic apparatus therein having a plurality of cores acting in opposition to each other, such cores having different magnetic material and so arranged that the resultant or differential effect of the cores actuates the apparatus and corrects or compensates for hysteresis, substantially as described.

3. In combination, an electric circuit, and an electro-magnetic apparatus therein having a plurality of cores acting in opposition to each other and of different magnetic retentiveness; the magnetic circuits of the apparatus being so disposed that the differential action of the cores furnishes the effective actuating force of the electro-magnetic apparatus, and neutralizes hysteresis effects, substantially as described.

4. In combination, in an electro-magnetic apparatus, a plurality of opposing cores having relatively different hysteresis coefficients and actuating the moving part or parts of the apparatus by the difference between their opposed effects, and means for energizing the cores.

5. The combination, in an electro-magnetic apparatus, of electro-magnets having respectively cores of soft iron and of hard iron or steel, the cores being arranged to act upon a moving part in opposition to each other, and means for energizing the cores.

In testimony whereof I have hereunto affixed my signature, this 23d day of February, 1893, in presence of two witnesses.

BRUNO ABDANK-ABAKANOWICZ.

Witnesses:
C. W. G. LITTLE,
A. M. TANNER.